United States Patent
Svensson

[19]

[11] Patent Number: 5,934,385
[45] Date of Patent: Aug. 10, 1999

[54] TAPPING TOOL AND METHOD FOR DRIVING OR CONTROLLING A TAPPING TOOL WITH PRESSURIZED FLUID

[75] Inventor: Gustav Svensson, Ljungby, Sweden

[73] Assignee: Svenska Precisionsverktyg AB, Eskilstuna, Sweden

[21] Appl. No.: 08/981,099

[22] PCT Filed: Jun. 28, 1996

[86] PCT No.: PCT/SE96/00861

§ 371 Date: Dec. 17, 1997

§ 102(e) Date: Dec. 17, 1997

[87] PCT Pub. No.: WO97/02110

PCT Pub. Date: Jan. 23, 1997

[30] Foreign Application Priority Data

Jun. 30, 1995 [SE] Sweden .................................. 9502371

[51] Int. Cl.⁶ .................................. B23Q 5/00; E21B 3/00
[52] U.S. Cl. .................................. 173/177; 173/178; 173/218; 408/59; 415/80
[58] Field of Search .................................. 173/177, 178, 173/181, 218, 202, 204; 408/57, 59, 124, 139; 415/80, 81, 82

[56] References Cited

U.S. PATENT DOCUMENTS

| | | |
|---|---|---|
| 2,356,669 | 8/1944 | Hook . |
| 2,709,267 | 5/1955 | Bashor et al. . |
| 2,724,134 | 11/1955 | Perlotto . |
| 3,708,241 | 1/1973 | Theis, Jr. et al. ........................ 415/80 |
| 4,006,996 | 2/1977 | Kasabian ................................ 279/102 |
| 4,277,209 | 7/1981 | Benjamin et al. ...................... 408/139 |
| 4,566,849 | 1/1986 | Flink . |
| 5,203,651 | 4/1993 | Johnson ................................... 408/59 |
| 5,566,770 | 10/1996 | Bowser ................................... 173/218 |

Primary Examiner—John Sipos
Assistant Examiner—Steven Jensen
Attorney, Agent, or Firm—Watson Cole Grindle Watson, P.L.L.C.

[57] ABSTRACT

A threading attachment for internal or external threading includes a spindle head (1) which is intended to be attached to a spindle on a machine tool and also a tap holder (5) with a holder body (6) in which a tap (13) is arranged during the threading work, the spindle head (1) and the tap holder (5) being extended along a joint axle. The tap holder (5) and the holder body (6) respectively have in threading position a power transmitting connection to the spindle head (1) via driving members (15, 16 and 28, 29, respectively) and have in back out position freely rotatable in relation to the spindle head (1) and arranged to be effected by a compressed medium via a driving member (18). The driving member can be a reaction turbine or an action turbine.

10 Claims, 2 Drawing Sheets

TAPPING TOOL AND METHOD FOR DRIVING OR CONTROLLING A TAPPING TOOL WITH PRESSURIZED FLUID

BACKGROUND OF THE INVENTION

1. Technical Field

The present invention relates to a threading attachment for internal or external threading which includes a spindle head that is intended to be attached to a spindle on a machine tool, and also a tap holder in which a tap is arranged during the threading work. The tap may, for example, be a tap for internal threading of holes or a die for external threading of a bar. The invention also relates to a threading method.

2. The Prior Art

For internal threading of holes by means of known threading attachments, the threading attachment is attached to a spindle on a machine tool and is also connected to a firm part of the machine tool via a protruding arm. The threading attachment includes a spindle head in which a tap holder is placed to support a tap and to cause the tap holder and the tap to rotate during the feed motion into the hole to be threaded when the spindle head is rotating. When the tap has reached the required depth of thread, the feed motion will be stopped and changed into an outfeed motion, the tap holder via a planetary gearing in the spindle head being brought to rotate in the opposite direction and to thread the tap out of the hole during the outfeed motion. In order to make this reversed direction of rotation possible, it is necessary to fix the position of the planet wheels in relation to the machine tool with the above-mentioned protruding arm.

Because of their construction, the known threading attachments of the kind mentioned above are expensive to produce and to some extent sensitive to interruption of the service. For that reason there is a requirement to achieve threading attachments which are both more inexpensive to produce and more reliable in running than the prior known threading attachments.

SUMMARY OF THE INVENTION

The object of the invention is to achieve a threading attachment of the type noted above which does not have the disadvantages of the hitherto known threading attachments, and to provide a method for internal or external threading of an object, the tap being arranged in a tap holder of a machine tool including a rotatable leading spindle and a compressed medium, for example, a cutting fluid for cooling, lubrication and grindings conveyor is available at the machine concerned.

The threading attachment according to the invention includes a spindle head which is intended to be connected with a spindle on a machine tool and also a tap holder in which a tap is arranged during the threading work. The threading attachment according to the invention includes a tap holder which in threading position has a power transmitting connection to the spindle head via driving members and in outfeed position is freely rotatable in relation to the spindle head, and that the tap holder directly or indirectly is arranged to be effected by a compressed medium.

The invention also involves a threading method wherein
  the spindle housing is imparted rotary motion and a linear feed motion,
  the tap holder is brought in power transmitting engagement with the spindle housing during the threading with the tap
  the rotation and the linear feed motion of the spindle housing is stopped when the tap has reached the required depth of thread,
  the spindle housing then is brought into a linear outfeed motion and
  during threading with the tap the tap holder is imparted rotation in a direction opposite to the direction of rotation, whereby the tap is backed out.

Thus, the novelty and characteristic of the threading attachment according to the present invention is that the tap holder with the tap in power transmitting sense is disengaged from the spindle housing during the back out process and is imparted rotation during the back out by means of a compressed medium. This medium is preferably a cutting fluid or another fluid or a gas, compressed air. As the tap holder and the spindle housing are disengaged when the required depth of thread is reached, the spindle of the machine tool is allowed to rotate during the outfeed motion as well as to stand still.

The tap holder is preferably made to rotate by means of a driving member which is arranged to be effected by a medium escaping through the tap, but it lies within the scope of the invention to effect the driving member with a compressed medium fed via a separate feeding device which is firmly connected with the machine tool, e.g., a swivel, as it is called, i.e., a sleeve enclosing the tap holder.

The invention will be beter understood by reference to the enclosed drawings taken with the following discussion.

DETAILED DESCRIPTION OF THE PREFERRED EMBODIMENTS

Figure 1:
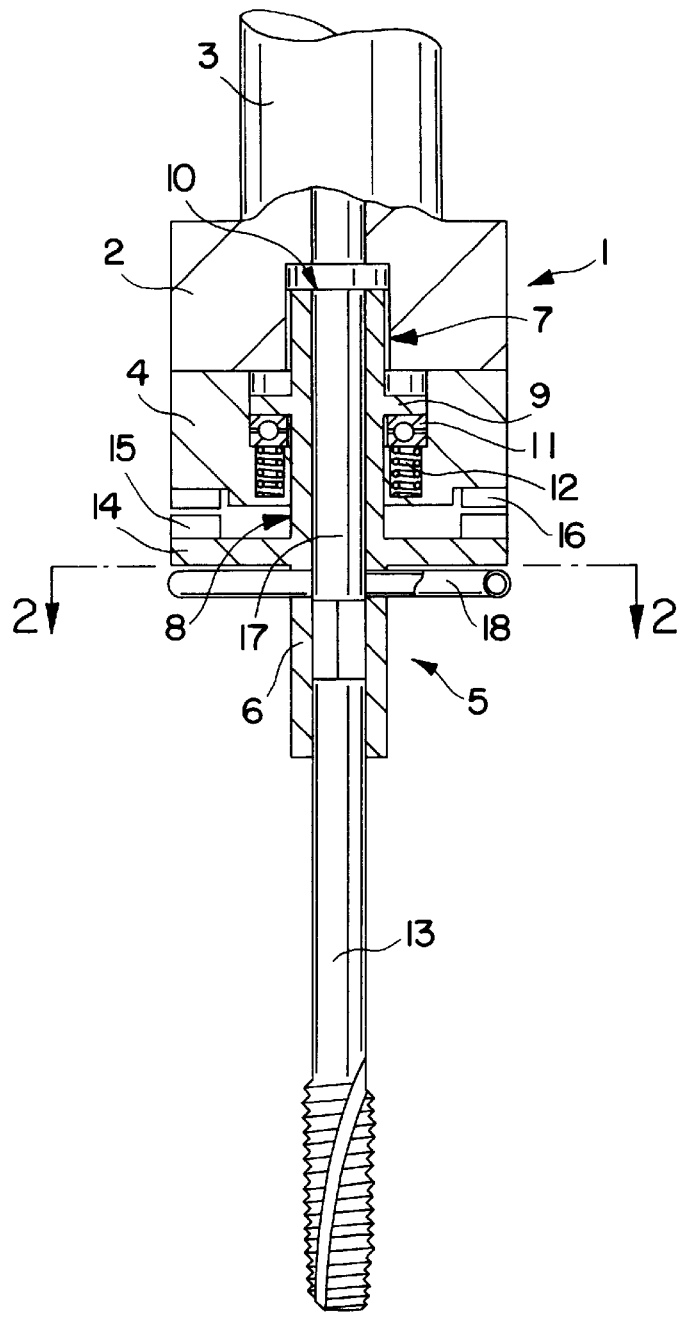
FIG. 1 shows a longitudinal section through a threading attachment according a preferred embodiment of to the invention.
Figure 2:
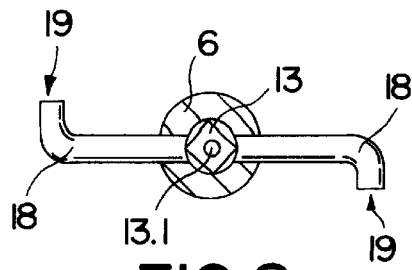
FIG. 2 shows a cross sectional view through the threading attachment according to FIG. 1 as seen along line 2—2.

The threading attachment shown in FIG. 1 is intended to be used for threading of holes in an operation comprising attachment and also threading and back out motion with a tap having cutting edges corresponding to the required thread in the hole. The threading attachment includes a spindle head 1, intended to be attached in a machine tool, a computer-controlled multiple-operation machine. The spindle head 1 includes a first part 2 which is provided with a spindle tap 3 that is connected with a driving spindle on the machine tool and also a second part 4 firmly attached to.

A tap holder 5 is rotatably mounted in the spindle head 1 and includes an elongated holder body 6 having radial journal surfaces 7, 8 which are connected with corresponding journal surfaces in the first part 2 and also the second part 4 of the spindle head 1, and a ring-shaped protruding member in the shape of a support ring 9, arranged to the holder body 6. The support ring 9 is intended to be moved in an axial direction in a corresponding cylinder-shaped space in order to carry thrust loads from a thrust bearing 11, arranged on one side of the support ring 9, shown as a thrust ball bearing in FIG. 1, which on its other side is in contact with two helical springs 12 which run ring-shaped in a cylinder-shaped notch in the second part 4 of the spindle head 1. The inner end of the holder body 6 is a piston area 10 for compressed cutting fluid, which moves the holder body 6 axially outwards from the spindle head 1 when the pressure rises. The free end of the holder body 6, which protrudes from the spindle head 1, includes an internal attachment for a tap 13 provided with a hole 13.1 in its longitudinal direction for delivery of cutting fluid during threading to the tip of the tap 13.

The holder body 6 supports in connection with the second part 4 of the spindle head 1 a driving disc 14 which is provided with a driving member in the shape of driving teeth 15 which are directed towards the spindle head 1, the second part 4 of which is provided with corresponding driving teeth 16 directed towards the driving disc 14. In threading position the holder body 6 is kept pressed-in into the spindle head 1 partly by means of the helical springs 12 which work between the thrust bearing 11 and the lower part 4 of the spindle head 1, and partly by means of the feeding force from the spindle of the machine tool which is connected to the spindle head 1. In pressed-in position the driving teeth 15, 16, which are directed towards each other, are engaged whereby the rotation of the spindle head 1 is transmitted to the holder body 6 and the tap 13, which then can be caused to screw itself into the hole to be threaded.

The holder body 6 shows also one in its centre line running boring 17 through which cutting fluid from a corresponding boring in the spindle of the machine tool can get to the hole 13.1 in the tap 13. The holder body 6 supports also at its free end two driving members in the shape of nozzles 18 which are connected with the boring 17 for cutting fluid. The openings 19 of the nozzles 18 are arranged diametrically and directed away from each-other and tangentially from a circle which runs in a plane transversally to the longitudinal direction of the holder body 6. Cutting fluid from the boring 17 in the holder body can escape through the nozzle openings either quite freely or after the opening of a spring-loaded valve cone in each nozzle 19, not shown in the figures. When the pressure on the cutting fluid rises above the pressure prevailing during the threading motion, the pressure from the cutting fluid causes the holder body 6 as a whole to move against the action of the springs 12 out off the spindle head 1, whereby the driving teeth 15, 16 are disengaged. At the same time the speed of the cutting fluid escaping from the nozzles 18 rises, which results in that the holder body 6 driven by the force of reaction from the escaping cutting fluid begins to rotate in a direction which is opposite to the direction of rotation of the spindle of the machine tool and of the spindle head 1. The nozzles 18 are then a reaction turbine which drives the rotation of the holder body 6.

In threading a hole the pressure of the cutting fluid is at first sufficiently low that it is unable to compress the springs 12 via the piston area 10. With a right-threaded hole the spindle head 1 together with the holder body 6 is caused to rotate clockwise seen in a direction towards the inlet opening. When the spindle head 1 is fed towards the hole, the tap 13 begins to cut threads in the hole and continues to do so until a required depth of thread is reached. In the meantime cutting fluid escapes under low pressure from the tip of the tap 13. When the required depth of thread is reached, the rotation of the spindle head is stopped and the pressure on the cutting fluid is increased at the same time as the spindle of the machine tool is drawn away with a determined speed. The tap 13 rotates in the direction of threading until the spindle is fed back when the driving teeth 15, 16 are disengaged and the holder body 6 begins to rotate in counterclockwise direction through the force of reaction from the cutting fluid escaping from the nozzles 18. The counterclockwise rotation of the holder body 6 in relation to the spindle head 1 results in the tap 13 being backed out of the ready-threaded hole. If the holder body 6 then reaches such a high rate of rotation that the axial speed of the holder body 6 exceeds the axial speed of the spindle, the driving teeth will engage again and stop the rotation of the holder body 6 until the spindle has moved away a bit further.

It should be observed that this joint action between the spindle head 1 and the holder body 6 can be achieved even without the support ring 9 being exposed to spring pressure from one side and the piston area 10 to increased fluid pressure from the other side. It is, however, desirable to secure the engagement between the driving teeth 15, 16 even before the tap 13 is attached to the hole to be threaded, which is achieved by means of the springs 12, as well as to secure that the driving teeth 15, 16 disengage during the back out motion of the tap 13, which is achieved by the increase of pressure in the cutting fluid.

It lies within the scope of the invention to arrange the reaction turbine which consists of the nozzles 18 in many different known ways, e.g., in the form of a conventional turbine wheel. In an alternative embodiment of the invention the reaction turbine which drives the rotation of the holder body 6 can be replaced by an action turbine, not shown in the figures, where, one blade wheel is arranged on the holder body 6 and cutting fluid in high speed is caused to escape from the nozzle openings in the spindle head 1.

Figure 3:
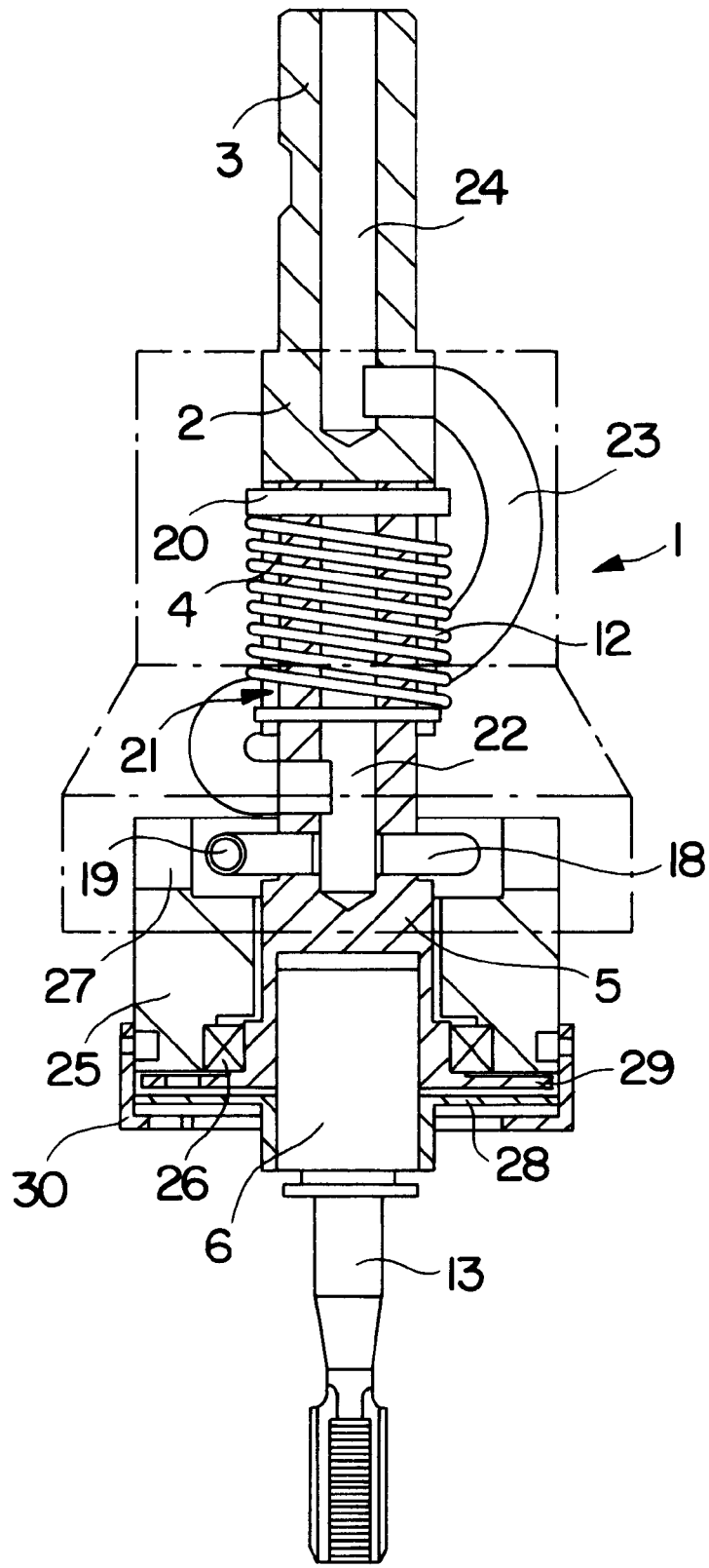
FIG. 3 shows schematically a threading attachment according to an alternative embodiment of the invention.

The threading attachment shown in FIG. 3 comprises a spindle head 1 which comprises a first part 2, which is provided with a spindle tap 3 for connection to the leading spindle on the machine tool and also a tubular second part 4 which protrudes downwards from the first part 2 and is an integrated part of the first part 2. A tap holder 5 is slidable linearly within the second part 4 of the spindle head 1 and comprises a cylinder-shaped holder body 6 which is freely rotatable within a corresponding cylinder-shaped hole at the outer end of the tap holder 5 and which shows an internal attachment for a tap 13. The tap holder 5 keeps introduced into the second part 4 to the spindle head 1 by means of a spring 12 which partly supports against a circlip at the lower end of the second part 4 and partly against a tap 20 which is arranged right through the inner end of the tap holder 5 and running in two elongated slots 21 in the second part 4.

The tap holder 5 supports also the nozzles 18 with tangentially directed nozzle openings 19 which are connected with an inner boring 22 in the tap holder 5 which in its turn via a conduit 23 is connected with a feed boring 24 for compressed cutting fluid in the spindle tap 3. A ring-shaped flywheel mass 25 is rotatable via a bearing 26 around the lower end of the tap holder 5 and shows blade 27 which is effected by the cutting fluid escaping from the nozzle openings 19 so that it gets a stored rotation energy when working. The holder body 6 for the tap 13 supports a driving disc 28 which can be brought in contact with either a corresponding ring-shaped flange 29 on the tap holder 5 or a corresponding sleeve-shaped ring 30 mounted on the flywheel mass 25 by a linear sliding in the cylinder-shaped hole in the tap holder 5. The driving disc 28 can be intended to transfer revolving moments either by friction or by one or more driving teeth or corresponding members which can be brought into engagement in threading and back out position respectively.

The holder body 6 is brought to rotate together with the tap holder 5 and the spindle head I as a whole when the spindle of the machine is fed towards the work piece and the hole to be threaded, by the driving disc 28 then being brought in contact with the ring-shaped flange 29 on the tap holder 5. During the threading work rotation energy is also accumulated in the flywheel mass 25. When the spindle of the machine is fed back quickly in the opposite direction the tap holder 5 is withdrawn in a direction away from the work piece simultaneously compressing the spring 12 the driving disc 28 is being brought in contact with the sleeve-shaped ring 30 which then transmits rotation energy from the flywheel mass 25 to the holder body 6 resulting in a back out motion of the tap 13. If the tap 13 should be backed out with a greater linear speed than the speed prevailing during the feed-back the driving disc 28 again is brought into contact with the ring-shaped flange 29 on the tap holder 5 in which the backout-speed is slowed down.

It lies within the scope of the invention to replace the tap for internal threading of holes in the examples mentioned above with a die for external threading of a bar. It also lies in the scope of the invention to let the compressed medium be in a closed circuit in contrast to the open circuits described in the examples above.

What is claimed is:

1. Threading attachment for internal or external threading comprising a spindle head (1) for a rotatable spindle, the spindle head (1) including a tap holder (5) with a holder body (6) for a tap (13) arranged in said holder body (6) during the threading, the spindle head (1) and the tap holder (5) extending along a joint axis, the tap holder (5) including first driving members (15, 28) and the spindle head (1) showing second driving members (16, 29), wherein the tap holder (5) with the holder body (6) during threading at a linear infeed movement of the spindle is directly connected to the rotating spindle head (1) by the driving members (15, 16 or 28, 29), and the tap holder (5) with the holder body (6) at a linear outfeed movement of the spindle is freely rotatable in relation to the spindle head (1) and being affected by a driving means (18) to rotate in a direction opposite to the rotation of the spindle and the spindle head (1) for the outfeed of the tap (13), the driving means (18) being operated by the escaping of a compressed medium.

2. Threading attachment according to claim 1, wherein the driving means (18) consists of a reaction turbine which is arranged on the tap holder (5) supporting the tap (13) and freely rotatable in relation to the spindle head (1) at the outfeed movement of the spindle.

3. Threading attachment according to claim 1, wherein the driving means consist of an action turbine comprising nozzles (9) arranged on a tap holder (5) and rotating with the spindle head (1), and blades (27) arranged on a flywheel mass (25) being freely rotatable on the tap holder (5) and arranged to be brought in contact with a freely rotatable holder body (6) which supports the tap (13) at the outfeed movement of the spindle.

4. Threading attachment according to claim 3, wherein the driving means consist of a driving disc (28) mounted on the holder body (6) and located between a ring flange (29) on the tap holder (5) and a ring sleeve (30) on the flywheel mass (25), the holder body (6) being movable in the axis direction so that the driving disc (28) can be brought in contact with either the ring flange (29) or the ring sleeve (30).

5. Threading attachment according to claim 1, wherein the tap holder (5) in neutral position is kept retracted in the spindle head (1) by means of spring members (12), and being able to move linearly in relation to the spindle head (1) towards the direction of the spring force during the outfeed motion from the work piece when the linear outfeed movement of the spindle is faster than the linear speed of the outfeed movement of the top (13).

6. Threading attachment according to claim 1, wherein the driving members comprises first driving teeth (15) arranged on the tap holder (5) and second driving teeth (16) arranged on the spindle head (1), the first driving teeth (15) being directed towards the second driving teeth (16) and movable in axis direction between an engagement position and a disengagement position.

7. Threading attachment according to claim 6, wherein the driving teeth (15, 16) in the disengagement position are disengaged from each other by axial displacement av the tap holder (5) in relation to the spindle head (1).

8. Threading attachment according to claim 1, wherein the compressed medium is constituted by a cutting fluid.

9. Threading method for internal or external threading of a workpiece by means of a treading attachment comprising a spindle head (1) for a rotatable spindle that includes a tap holder (5) with a holder body (6) for a tap (13), comprising the steps of:

(a) rotating the spindle head (1) and linearly moving the spindle head toward the workpiece, (b) engaging the tap holder (5) with the holder body (6) with ;the spindle housing (1) during threading of the workpiece with the tap (13), (c) stopping a the linear movement of the spindle housing (1) when the tap (13) has reached a required depth of thread of the workpiece, (d) linearly moving the spindle housing away from the workpiece, and (e) rotating the tap holder (5) width the holder body (6) by means of a driving member which is driven by a compressed medium in a direction which is opposite to the direction of rotation of the spindle during the threading with the tap (13) whereby the tap (13) is fed out.

10. Threading method according to claim 9 comprising engaging cooperating driving members on the tap holder and the spindle head during step (b), and disengaging said cooperation driving members during step (d).

* * * * *